US012403695B2

(12) United States Patent
Cessel et al.

(10) Patent No.: US 12,403,695 B2
(45) Date of Patent: Sep. 2, 2025

(54) PRINT APPARATUS MAINTENANCE

(71) Applicant: Hewlett-Packard Development Company, L.P., Spring, TX (US)

(72) Inventors: Gianni Cessel, Sant Cugat del Valles (ES); Carles Carmona Calpe, Sant Cugat del Valles (ES); Marcos Casaldaliga Albisu, Sant Cugat del Valles (ES); Pablo Carmelo Mena Rodriguez, Sant Cugat del Valles (ES); Lluis Abello Rosello, Sant Cugat del Valles (ES); Ma. Pilar Velazquez Gomez, Sant Cugat del Valles (ES); Ricard Silvestre, Sant Cugat del Valles (ES); Jaume Verges Llahi, Sant Cugat del Valles (ES); Dorkaitz Alain Vazquez Fernandez, Sant Cugat del Valles (ES); Jordina Torrents Barrena, Sant Cugat del Valles (ES); Maurizio Bordone, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 161 days.

(21) Appl. No.: 18/557,635

(22) PCT Filed: Apr. 28, 2021

(86) PCT No.: PCT/US2021/029716

§ 371 (c)(1),
(2) Date: Oct. 27, 2023

(87) PCT Pub. No.: WO2022/231585

PCT Pub. Date: Nov. 3, 2022

(65) Prior Publication Data

US 2024/0208228 A1 Jun. 27, 2024

(51) Int. Cl.
*B41J 2/165* (2006.01)
*B41J 2/045* (2006.01)
*B41J 2/21* (2006.01)

(52) U.S. Cl.
CPC ......... *B41J 2/16579* (2013.01); *B41J 2/0451* (2013.01); *B41J 2/04586* (2013.01);
(Continued)

(58) Field of Classification Search
CPC ................ B41J 2/16535; B41J 2/16517; B41J 2/16547; B41J 2002/1657; B41J 2/165; B41J 2002/16573
See application file for complete search history.

(56) References Cited

U.S. PATENT DOCUMENTS 9,452,607 B2 9/2016 Kuypers et al.
2010/0214355 A1 8/2010 Inoue
2014/0176628 A1* 6/2014 Anderson ............ B41J 2/16508 347/12

FOREIGN PATENT DOCUMENTS

EP 2979874 A1 2/2016
JP 2012-071573 A 4/2012

* cited by examiner

*Primary Examiner* — Thinh H Nguyen
(74) *Attorney, Agent, or Firm* — Jordan IP Law, LLC

(57) ABSTRACT

A print apparatus is disclosed. The print apparatus comprises a print fluid application unit having a plurality of nozzles through which print fluid is to be deposited onto a printable medium during a printing operation. The print apparatus also comprises a nozzle cleaning surface to engage nozzles during a nozzle cleaning operation. The print apparatus also comprises a scanning unit and a controller. The controller is to control the print fluid application unit to deposit print fluid from nozzles of the plurality of nozzles according to an intended pattern onto the nozzle cleaning surface; control the scanning unit to scan the pattern formed on the nozzle (Continued)

cleaning surface; and responsive to determining, based on the scan, that print fluid from a nozzle of the plurality of nozzles has not been deposited according to the intended pattern, generate an instruction signal regarding maintenance of the print fluid application unit. A method and a machine-readable medium are also disclosed.

15 Claims, 6 Drawing Sheets

(52) U.S. Cl.
CPC ......... *B41J 2/16535* (2013.01); *B41J 2/2139* (2013.01); *B41J 2/2142* (2013.01); *B41P 2235/20* (2013.01)

PRINT APPARATUS MAINTENANCE

BACKGROUND

Some print apparatuses use a print fluid application unit to deliver print agent, such as ink, onto a printable substrate. As the print fluid application unit scans over the printable substrate, drops of ink may be delivered through nozzles of the print fluid application unit in accordance with an image or pattern defined in image data, to form an image on the printable substrate.

During the printing process, residual ink which has not been deposited onto the printable substrate may remain in the nozzles and, if left, may dry and could cause the nozzles to become blocked.

BRIEF DESCRIPTION OF DRAWINGS

Examples will now be described, by way of non-limiting example, with reference to the accompanying drawings, in which.

DETAILED DESCRIPTION

Figure 1:
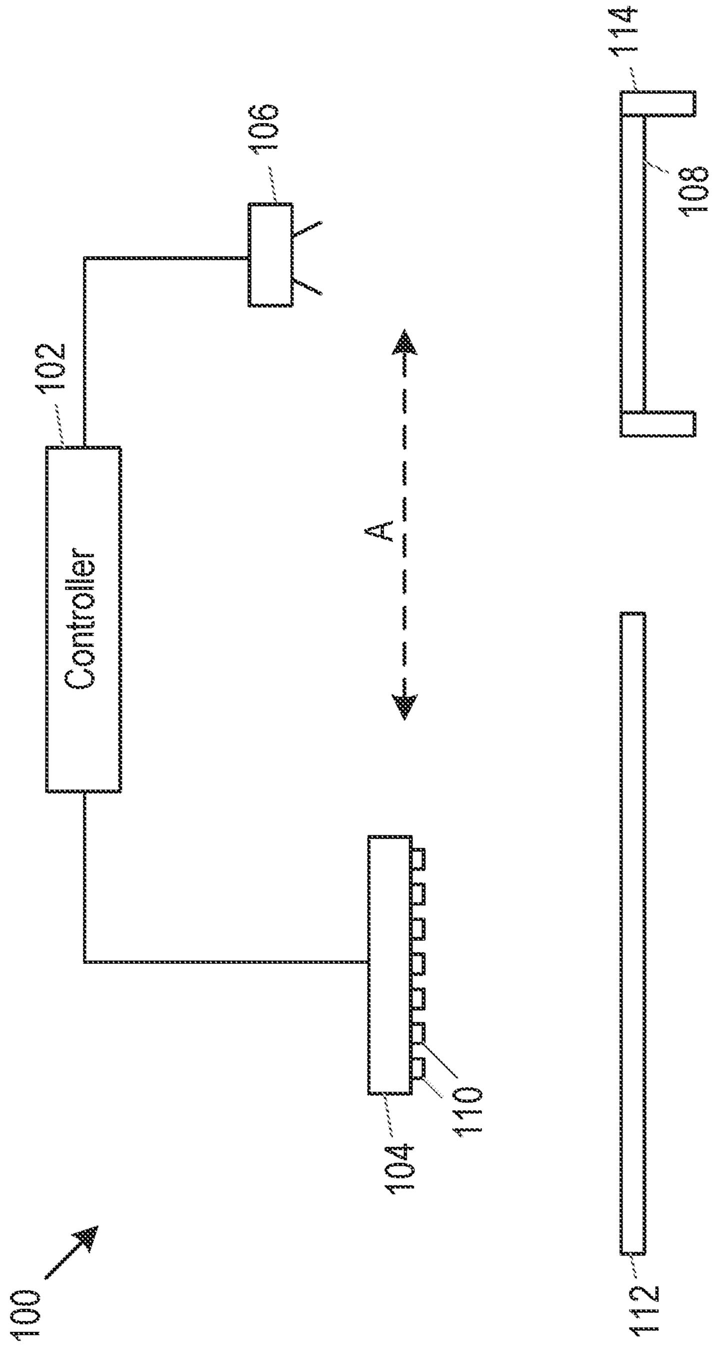
FIG. 1 is a schematic illustration of an example of a side view of a print apparatus.

Examples disclosed herein may be applicable to all types of printing in which print agent (sometimes referred to as print fluid), such as ink, is delivered onto a surface using a print agent distributor (sometimes referred to as a print fluid application unit or print head). Examples are applicable to two-dimensional (2D) print systems, such as inkjet print systems, in which ink is deposited onto a printable substrate via nozzles of a print head. Similarly, examples are applicable to three-dimensional (3D) print systems, also referred to as additive manufacturing systems, in which three-dimensional objects are generated.

Referring briefly to three-dimensional print systems, additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. The print agent may be deposited onto the build material via nozzles of a print agent distributor.

In some two-dimensional print apparatuses, print agent or print fluid, such as ink, may be deposited onto a printable medium, such as paper or card, using a print head, which may be referred to as a print fluid application unit. Such a print head may include a nozzle or multiple nozzles, through which print fluid can be deposited during a printing operation, in order to mark the printable medium. Some print apparatuses may include multiple print heads, and each print head may deposit print fluid of a particular color, or may deposit print fluid of multiple colors. Print fluid may be supplied to the nozzles of the print head(s) from a print fluid source. In some examples, print fluid may be stored in a print fluid reservoir, for example in a cartridge which may be replaceable. The print fluid reservoir or cartridge may be in fluid communication with nozzles of the print head through which print fluid is to be deposited.

When print fluid is deposited from nozzles of a print head during a printing operation, some print fluid may remain in or at the ends of the nozzles, and this residual print agent may dry and cause nozzles to become blocked, or may create unintended effects on future print fluid depositions through those nozzles. For example, dried print fluid deposits on or around the nozzles may cause nozzles to fire print fluid off target or may cause an intended amount of print fluid to be deposited through the nozzle. Such issues may lead to image quality defects in a printed image. Various techniques may be implemented to remove print fluid from the nozzles before it dries. A spitting procedure may be used to fire print fluid through the nozzles into a spitting region (e.g. a spittoon) so as to clear the nozzles. The nozzles may also be wiped to remove residual print fluid from the ends of the nozzles. In an example of such a wiping procedure, the print head is moved such that the nozzles are brought into contact with a wiping surface. The print head is then moved such that the nozzles are wiped over the wiping surface. In some examples, the wiping surface may comprise a wicking material such that print agent present at the ends of nozzles is wicked away from the nozzles and wiped onto or absorbed by the wiping surface.

In some examples, the wiping surface used to wipe the nozzles of the print head may comprise a web or roll of material which can be advanced (e.g. fed from a feed roller onto a capture roller) to prevent a particular region of the wiping surface from becoming saturated with print fluid.

To avoid unwanted print quality defects, a test image (sometimes referred to as an assessment image or a nozzle check image) may be printed onto the printable medium, before performing a printing operation. However, printing such a test image may use up part of a valuable printable medium (e.g. high-quality card), and the printable medium containing the test image may be removed from the print apparatus before the intended printing operation can begin. Thus, not only does this process result in wastage for the user of the print apparatus, but it also impacts on the productivity of the print apparatus, since the printing operation is not begun until the test image has been printed and analyzed. Examples of the present disclosure provide a mechanism by which the nozzles of a print head can be checked without delaying or interrupting the printing operation. Specifically, according to examples disclosed herein, an image or pattern (e.g. a test image or nozzle check image) is printed onto the wiping surface, rather than the printable medium being used as part of the printing operation. A sensor is used to analyze the printed image in real time, after the image has been printed, and analysis of the image can be used to detect issues with any of the nozzles of the print head(s). By printing the test image on the wiping surface, the printing operation using the printable medium is not adversely affected, and the test image may be printed on the wiping surface during the printing operation, for example while the print head is in position over the wiping surface for a scheduled cleaning event.

Referring now to the drawings, FIG. 1 is a schematic illustration of an example of an apparatus 100, such as a print apparatus. The print apparatus 100 may comprise a two-dimensional printer or an additive manufacturing apparatus (e.g. a three-dimensional printer) as discussed above. The print apparatus 100 comprises a controller 102, a print fluid application unit 104, a scanning unit 106 and a nozzle cleaning surface 108. The print apparatus 100 may comprise other features, but they are not discussed herein. The controller 102 may be in communication with the print fluid application unit 104 and/or the scanning unit 106. The print fluid application unit 104, which may be referred to as a print agent distributor or a print head, has a plurality of nozzles 110 through which print fluid is to be deposited onto a printable medium 112 during a printing operation. The nozzle cleaning surface 108 is to engage (e.g. come into contact with) a nozzle or nozzles 110 during a nozzle cleaning operation. Such a nozzle cleaning operation may form part of a maintenance operation or a service operation, which may be scheduled to take place between print operations or during a printing operation, for example at intervals. The nozzle cleaning operation may involve bringing the nozzles 110 into contact with the nozzle cleaning surface 108 (e.g. a wiping surface), and moving the nozzles and/or the nozzle cleaning surface relative to one another such that the nozzles are wiped onto the nozzle cleaning surface. In this way, any residual print fluid remaining on the nozzles 110 can be wiped onto, and/or absorbed by, the nozzle cleaning surface 108. As noted above, the nozzle cleaning surface 108 may comprise a web which may, in some examples, be formed as a roll on a roller 114, or a pair of rollers.

During a printing operation, the print fluid application unit 104 and the printable medium 112 are moved relative to one another (i.e. the print fluid application unit may be moved over the printable medium and/or the printable medium may be moved under the print fluid application unit) as print fluid is deposited from the nozzles 110. When the print fluid application unit 104 is to undergo a maintenance operation (e.g. a nozzle cleaning operation), the print fluid application unit 104 may be brought into a position where the nozzles 110 can contact the nozzle cleaning surface 108. Thus, in some examples, the print fluid application unit 104 may be moved from a position over the printable medium 112 to a position over the nozzle cleaning surface 108 while, in other examples, the nozzle cleaning surface may be moved into a position beneath the print fluid application unit. In one example, the fluid application unit 104 is movable along an axis in a direction indicated by the double-headed dashed arrow A in FIG. 1, for example between a first position where the print fluid application unit is above the printable medium 112 and a second position where the print fluid application unit is above the nozzle cleaning surface 108.

The scanning unit 106 may be used to scan (e.g. capture an image of) a surface, such as a surface of the printable medium 112 and/or the nozzle cleaning surface 108. More particularly, the scanning unit 106 may scan an image, mark or pattern formed on a surface. In some examples, the scanning unit 106 may be considered to be a sensor or an image capture device. Such a sensor may detect, measure and/or or capture an image of a mark, pattern or image formed on a surface, for example by print fluid deposited from nozzles of the print fluid application unit 104. In the example shown in FIG. 1, the scanning unit 106 is positioned above the nozzle cleaning surface 108 such that it can detect, measure and/or capture an image of a mark formed on the nozzle cleaning surface. In some examples, the scanning unit 106 may be movable relative to the nozzle cleaning surface 108 and the printable medium 112, such that the scanning unit is also able to detect, measure and/or capture an image of a mark formed on the printable medium. As discussed in greater detail below, the scanning unit 106 may, in some examples, move synchronously with the print fluid application unit 104. Thus, the scanning unit 106 may be movable along an axis in the direction indicated by the dashed arrow A in FIG. 1.

The controller 102, which may comprise a processor or multiple processors for example, may perform various functions operate the various components of the print apparatus 100. The controller 102 is to control the print fluid application unit 104 to deposit print fluid from a nozzle or nozzles of the plurality of nozzles 110 according to an intended pattern onto the nozzle cleaning surface 108. The intended pattern may, for example, comprise a test image or a nozzle check image or pattern in which a nozzle 110 of the print fluid application unit 104 is intended to deposit print fluid onto the nozzle cleaning surface 108 in such a way that it can be detected, sensed or imaged using the scanning unit 106. For example, through control of the print fluid application unit 104 by the controller 102, a plurality of nozzles 110 may deposit print fluid onto the nozzle cleaning service 108 to form a discrete deposit or mark. For example, a mark formed by a first nozzle may be separated (e.g. discrete) from a mark formed by any nozzle adjacent to the first nozzle. In this way, by depositing print fluid according to a particular intended pattern, any errors, omissions, and/or misalignments in the pattern can be detected, and a determination can be made as to which nozzle or nozzles are responsible.

The controller 102 is to control the scanning unit 106 to scan the pattern formed on the nozzle cleaning surface 108. As noted above, the scanning unit 106 may comprise a sensor that detects marks formed on the surface being scanned (i.e. the nozzle cleaning surface 108), such that the controller 102 or another processing device is able to record the presence or omission of a mark that is intended or expected to be present according to the intended pattern. In a more sophisticated example, the scanning unit 106 may comprise an image capture device that captures an image or multiple images of the marks as they are being formed or after they have been formed on the surface being scanned. The controller 102 or another processing device may then analyze the image or images to determine whether or not the marks are in accordance with the intended pattern. If all of the nozzles 110 that were intended to deposit print fluid do actually deposit print fluid according to the intended pattern, then the controller 102 or another processing device may determine that those nozzles whose deposits have been analyzed are functioning as intended and that maintenance of those nozzles is not to be performed at that time. However, if the controller 102 or another processing device determines that a nozzle or multiple nozzles that were intended to deposit print fluid have failed to deposit print fluid according to the intended pattern (e.g. by failing to deposit print fluid at all or by depositing print fluid forming a mark other than intended), then it may be determined that the respective nozzle or nozzles are defective (e.g. blocked or broken). Thus, responsive to determining, based on the scan, that print fluid from a nozzle 110 of the plurality of nozzles has not been deposited according to the intended pattern, the controller 102 is to generate an instruction signal regarding maintenance of the print fluid application unit 104.

If it is determined by the controller 102 that the deposits from the nozzles 110 are not in accordance with the intended pattern, then the controller generates an instruction signal that may cause the print fluid application unit 102 to undergo a maintenance operation. The nature of the maintenance and, therefore, the instruction signal generated by the controller 102 may depend on the degree to which the intended pattern has (or has not) been printed. For example, if the controller 102 determines that a mark made by a single nozzle 110 is slightly misaligned with regard to its intended alignment according to the intended pattern, then the controller may generate an instruction signal to schedule a maintenance operation (e.g. a nozzle cleaning operation) at a particular time or following completion of the current printing operation. However, if the controller 102 determines that several nozzles (e.g. more than a defined threshold number of nozzles) have failed to deposit print fluid according to the intended pattern, then this may be recognised as a more significant defect with a greater likelihood of causing an image quality defect in a printed image and, therefore, the controller may generate an instruction signal to cause a maintenance operation to be performed in respect of the print fluid application unit 104 or in respect of a subset of nozzles (e.g. those nozzles exhibiting defective deposits). In some examples, the instruction signal regarding maintenance of the print fluid application unit 104 may comprise a signal to cause the nozzle 110 of the print fluid application unit to be wiped by the nozzle cleaning surface 108. As discussed below, other instruction signals may be generated by the controller 102 in response to determining that a nozzle 110 has failed to deposit print fluid according to the intended pattern.

Figure 2:
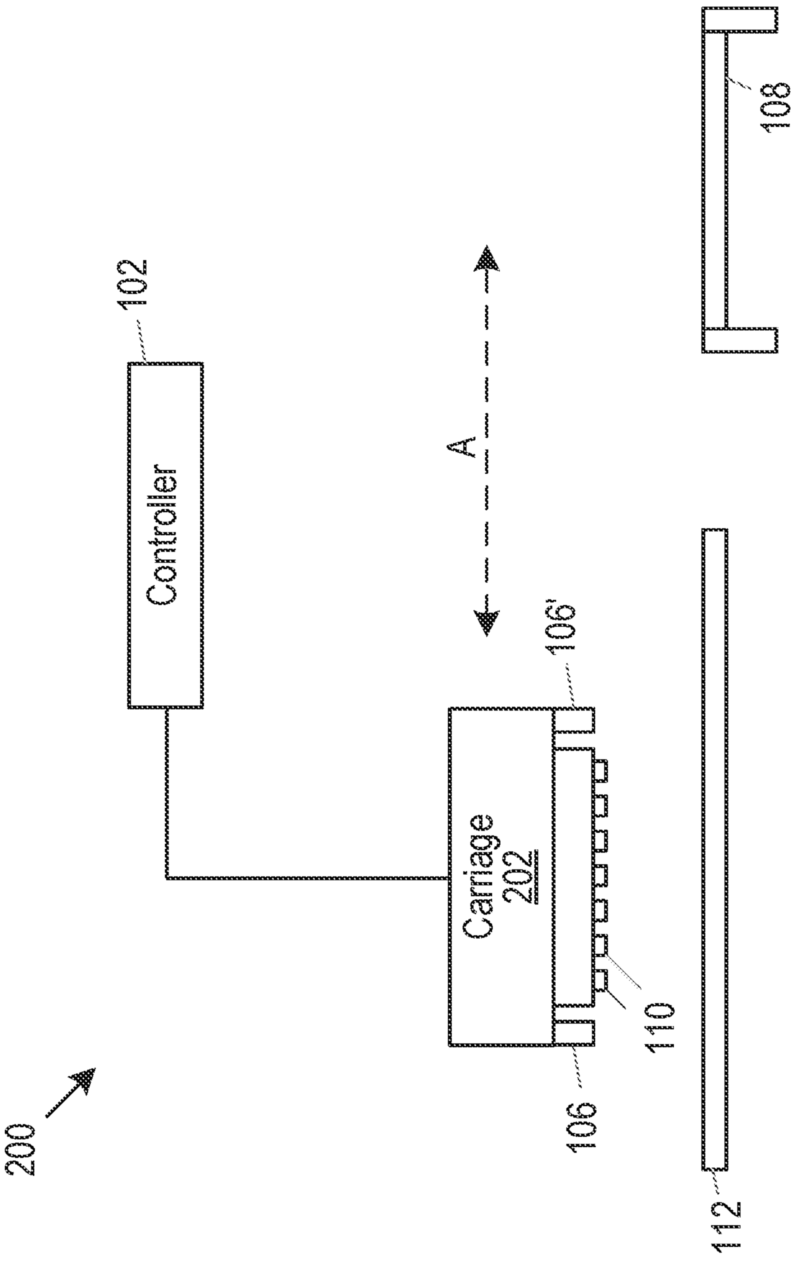
FIG. 2 is a schematic illustration of a further example of a side view of a print apparatus.

FIG. 2 is a schematic illustration of a further example of an apparatus, such as a print apparatus 200. The print apparatus 200 is similar to the print apparatus 100 discussed above, and includes the controller 102, the print fluid application unit 104, the scanning unit 106 and the nozzle cleaning surface 108. As noted above, the scanning unit 106 and the print fluid application unit 104 may be movable relative to the printable medium 112 in a synchronous manner. In some examples, the scanning unit 106 and the print fluid application unit 104 may be movable relative to the nozzle cleaning surface 108 in a synchronous manner. Thus, the scanning unit 106 and the print fluid application unit 104 may move together. For example, the scanning unit 106 and the print fluid application unit 104 may be coupled to one another, or formed on or coupled to carrier unit such that they are caused to move relative to the printable medium 112 and/or the nozzle cleaning surface 108 in the same direction, at the same speed and/or at the same time.

According to the example shown in FIG. 2, the apparatus 200 may further comprise a carriage 202 coupled to the print fluid application unit 104 and the scanning unit 106. The carriage 202 is to move over the printable medium 112 and the nozzle cleaning surface 108. The carriage 202 may be movable along an axis in the direction indicated by the dashed arrow A in FIG. 2. In some examples, the carriage 202 may be mounted on a track or rail (not shown in FIG. 2) extending over the printable medium 112 and the nozzle cleaning surface 108. In this example, as the carriage 202 moves over the nozzle cleaning surface 108, print fluid can be deposited from the nozzles 110 according to the intended pattern and, as the print fluid is deposited onto the nozzle cleaning surface, the scanning unit 106 can measure the marks formed on the nozzle cleaning surface (e.g. sensing the presence or omission of a mark, or capturing an image of the marks for further analysis) in real time. In some examples, a second scanning unit 106' may be provided as shown in FIG. 2. The second scanning unit 106' may be located at one end of the carriage 202 (e.g. at one end of the nozzles 110) while the scanning unit 106 may be located at another, opposite end of the carriage (e.g. at an opposite end of the nozzles). In this way, print fluid may be deposited from the nozzles 110 onto the nozzle cleaning surface 108 as the carriage 202 is moved in either direction indicated by the double-headed dashed arrow A, and the trailing scanning unit 106, 106' may scan the pattern formed on the nozzle cleaning surface. Thus, deposits from the nozzles 110 can be checked while the carriage 202 is moving in either direction.

The scanning unit 106 (and/or the second scanning unit 106') may comprise an optical sensor to detect deposits of print fluid formed on the nozzle cleaning surface 108 by a nozzle or nozzles 110 of the plurality of nozzles. As noted above, the scanning unit 106, 106' may comprise an image capture device such as a camera, which may capture an image or a stream of images showing the print fluid deposits (e.g. the marks) formed on the nozzle cleaning surface 108.

Figure 3:
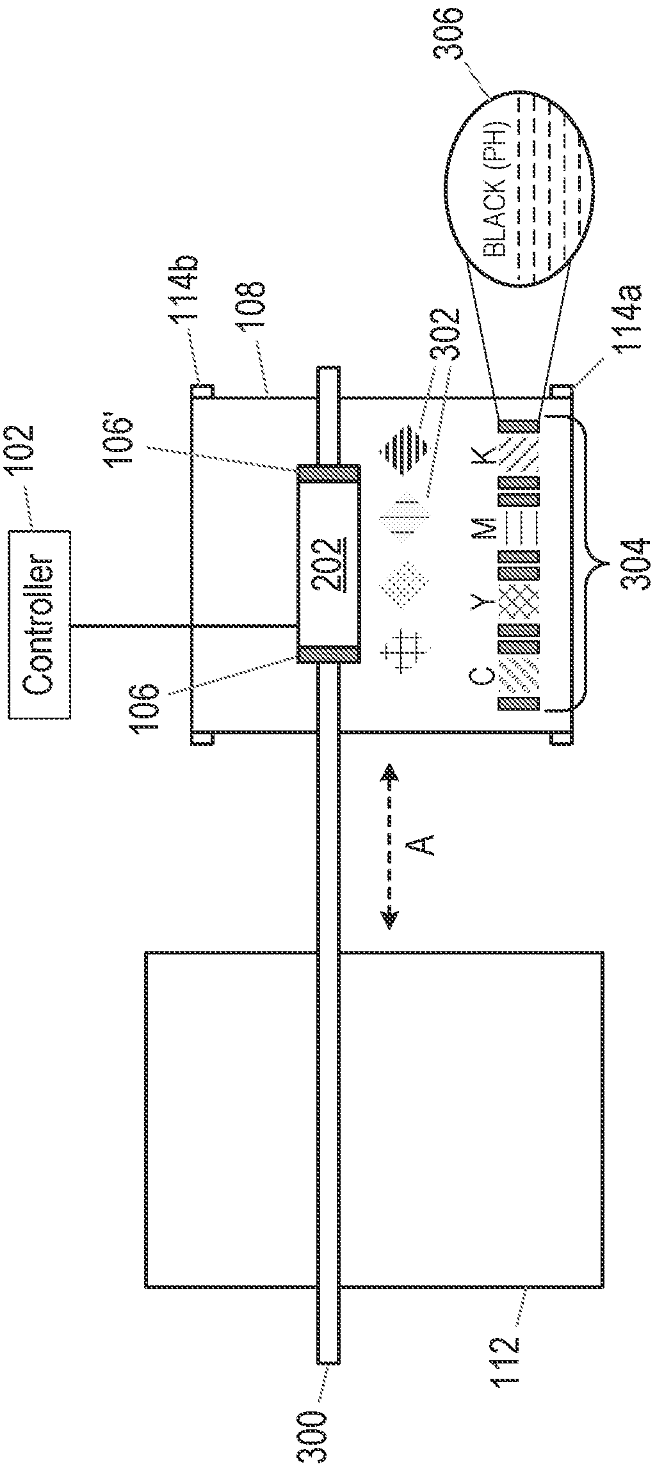
FIG. 3 is a schematic illustration of a further example of a plan view of a print apparatus.

FIG. 3 is a schematic illustration of a plan view of the apparatus 200. In this example, the carriage 202 is mounted on a rail 300, such that the carriage is able to traverse across the printable material 112 and the nozzle cleaning surface 108 along an axis in the directions indicated by the double-headed dashed arrow A. The print fluid application unit 104 and the nozzles 110 are on the underside of the carriage 202 and, therefore, are not visible in FIG. 3. The scanning unit or units 106, 106' are mounted to the carriage 202. The nozzle cleaning surface 108 in this example is in the form of a web of material formed around a pair of rollers **114*a*, 114*b*. For example, the web of material 108 may initially be wound or wrapped around the roller 114*a* and, as the web of material is advanced, the material is taken up by the roller 114*b*. Once the entire web of material has been taken up onto the roller 114*b*, the web of material may be replaced with a clean web by an operator. Operation of the rollers 114*a*, 114*b* and, therefore, advancement of the nozzle cleaning surface 108 as the web of material is wound up onto the roller 114*b* may be controlled by the controller 102 or by some other processing unit. Thus, the controller 102 may be in operative communication with a web advancement mechanism (not shown in FIG. 3) that causes advancement of the nozzle cleaning surface 108**.

In the example shown in FIG. 3, marks 302 are shown on the nozzle cleaning surface 108. The marks 302 may comprise marks that have been formed as a result of a nozzle cleaning operation, during which the nozzles 110 of the print fluid application unit 104 have been wiped on the nozzle cleaning surface 108. Also shown on the nozzle cleaning surface 108 are marks or patterns 304, which are marks resulting from print fluid being deposited from the plurality of nozzles 110 according to the intended pattern. In this example, the patterns 304 include marks made by cyan (C) print fluid, marks made by yellow (Y) print fluid, marks made by magenta (M) print fluid and marks made by black (K) print fluid. An enlarged region 306 of the pattern made by black print fluid shows that, in this example, each nozzle is to deposit print fluid in a discrete line. The enlarged region 306 also shows an indication of the color of the print fluid that was deposited to form the mark or pattern, and an indication of the print head housing the nozzles that deposited the print fluid (in this example, print head 4—PH4). As noted above, different print apparatuses may have different numbers of print heads. In some examples, each print head may deposit print fluid of particular color while, in other examples, print fluid of a particular color may be deposited from nozzles of multiple print heads. In some examples, a print fluid application unit 104 may include one or multiple print heads, and a print apparatus may include one multiple print fluid application unit or multiple print fluid application units.

The pattern 304 shown in FIG. 3 includes deposits formed by all four print heads housed in the print fluid application unit 104 (i.e. in this example, each of the four print heads deposits print fluid of a different color, C, Y, M, K). While, in some examples, it may be intended that all of the nozzles of a print head or hall of the nozzles of all print heads of a print apparatus after deposit print fluid according to an intended pattern onto the nozzle cleaning surface 108, in other examples, just a subset of nozzles may be operated to deposit print fluid according to an intended pattern. For example, the controller 102 may control the print fluid application unit 104 to deposit just cyan print fluid from nozzles of a print head in fluid communication with a cyan print fluid source. In this example, just part of the pattern 304 would be printed onto the nozzle cleaning surface 108. Thus, different subsets of nozzles and/or different print heads may be controlled to deposit print fluid onto the nozzle cleaning surface 108 at different times, so that nozzles can be checked for defects during a printing operation, without interrupting or impacting on the printing of the image on the printable medium 112.

While the scanning unit 106 may be used for scanning the marks or patterns 304 formed by the nozzles, in order to check their adherence to the intended pattern, the data acquired using the scanning unit may also serve other purposes. In one example, the scanning unit 106 may scan the nozzle cleaning surface 108 as the scanning unit passes over the nozzle cleaning surface, and a determination may be made regarding whether or not the nozzle cleaning surface has received more than a defined threshold amount of print fluid. If the threshold amount of print fluid has been deposited onto the nozzle cleaning surface, then it may be determined that the nozzle cleaning surface (e.g. in the form of a web of material) should be advanced, and rolled onto the roller 114*b*, thereby revealing a portion of clean, unused web on which future cleaning operations may be performed or on which print fluid may be deposited according to the intended pattern. Thus, in some examples, the nozzle cleaning surface 108 may comprise a web of material. In such examples, the controller 102 may be to generate an instruction signal to advance the web of material, responsive to determining, based on the scan, that a defined threshold amount (e.g. a first defined threshold amount) of print fluid has been deposited onto a portion of the nozzle cleaning surface onto which the print fluid is to be deposited. In this way, when it is intended to deposit print agent according to the intended pattern, the nozzle cleaning surface 108 can be checked and, if it is too dirty, then the web can be advanced so that the pattern can be deposited onto a clean portion of the web, thereby improving the likelihood of an accurate analysis of the printed pattern.

In other examples, the scanning unit 106 may be used to determine if the nozzle cleaning surface 108 has become saturated (e.g. if too much print fluid has been deposited over the entire web of material) such that the web of material is due to be replaced. Thus, in examples where the nozzle cleaning surface 108 comprises a web of material, the controller 102 may be to generate an alert signal, responsive to determining, based on the scan, that an amount of print fluid that has been deposited onto the nozzle cleaning surface meets or exceeds a defined threshold amount (e.g. a second defined threshold amount). The second defined threshold amount may be more than the first defined threshold amount. In this example, the alert signal may comprise a signal to be presented to an operator of the print apparatus (e.g. via a computing device such as a desktop computer, a laptop computer, a smart phone, a wearable device or via a display on or associated with the print apparatus itself) indicating that the web of material used as the nozzle cleaning surface is dirty and is to be replaced. In other examples, the alert signal may comprise an instruction to cause the print apparatus to halt printing or pause the printing operation until the nozzle cleaning surface has been replaced.

Figure 4:
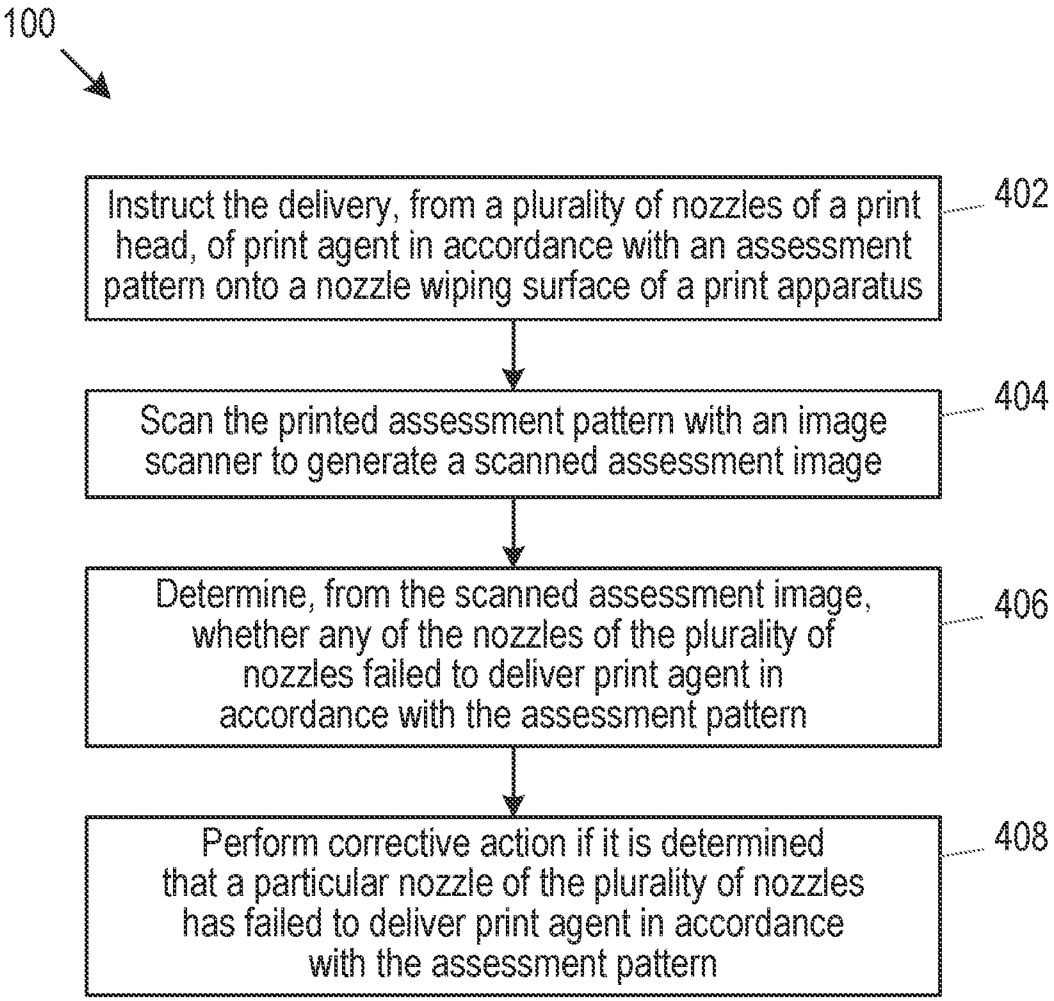
FIG. 4 is a flowchart of an example of a method according to the present disclosure.

In the examples shown in FIGS. 1, 2 and 3, the controller 102 is shown to be part of the print apparatus 100, 200. In some examples, the controller 102 may be located near to the print fluid application unit 104, for example housed within the carriage 202. However, it will be appreciated that, in other examples, the controller 102 may be remote from the print apparatus 100, 200 and may, therefore, communicate with components of the print apparatus wirelessly. The present disclosure also provides a method. FIG. 4 is a flowchart of an example of a method 400. The method 400, which may comprise a computer-implemented method, may be considered to be a method of managing print apparatus maintenance. The method 400 comprises, at block 402, instructing the delivery, from a plurality of nozzles 110 of a print head, of print agent (e.g. print fluid) in accordance with an assessment pattern onto a nozzle wiping surface 108 of a print apparatus 100, 200. The print head may, in some examples, comprise the print fluid application unit 104 discussed above while, in other examples, a print fluid application unit may comprise multiple print heads. The assessment pattern may comprise or be similar to the intended pattern discussed above, giving rise to the pattern 304, 306 shown in FIG. 3. For example, the assessment pattern may comprise a discrete deposit of print agent from each nozzle of the plurality of nozzles 110.

At block 404, the method 400 comprises scanning the printed assessment pattern with an image scanner 106 to generate a scanned assessment image. The image scanner 106 may comprise the scanning unit discussed above, and may for example comprise an image capture device such as a camera. The scanned assessment image may comprise an image of the pattern 304 formed on the nozzle cleaning surface 108.

The method 400 comprises, at block 406, determining, from the scanned assessment image, whether any of the nozzles of the plurality of nozzles 110 failed to deliver print agent in accordance with the assessment pattern. Such a determination may be made if it is apparent from the scanned assessment image that any part of the image is not in accordance with the assessment pattern. For example, the determination of a failure may be made if a mark formed by any nozzle is misaligned with respect to its intended alignment, if a mark formed by any nozzle is missing, when the mark appears in the assessment pattern, or if a mark appears too dark, too light, too large, or too small with respect to its intended appearance in the assessment pattern. In other examples, other assessment metrics may be used to determine whether or not the print agent has been delivered in accordance with the assessment pattern.

At block 408, the method 400 comprises performing corrective action if it is determined that a particular nozzle of the plurality of nozzles 110 has failed to deliver print agent in accordance with the assessment pattern. Depending on the nature of the failure, different corrective actions may be taken and the timing of the corrective action may also depend on the nature of the failure. In some examples, the corrective action may comprise an action selected from a group of actions. For example, the corrective action may comprise providing a notification for delivery to an operator of the print apparatus. Such a notification may inform the operator that a nozzle defect has been detected and that corrective action is to be taken. In other examples such a notification may inform the operator that the nozzle wiping surface of the print apparatus is to be replaced. In some examples, the corrective action may comprise performing or scheduling a nozzle wiping operation in respect of the particular nozzle. For example, if it is determined that a nozzle is dirty or clogged with print agent or that a group of nozzles are misfiring due to being clogged with print agent, then those nozzles may be wiped immediately on the nozzle wiping surface 108 or a nozzle wiping operation may be scheduled for the next occasion that the print head moves over the nozzle wiping surface. In some examples, the corrective action may comprise performing a realignment action in respect of the particular nozzle. For example, if the printed assessment pattern indicates that the nozzle itself is misaligned or that print agent fired from the nozzle is deposited in a position different to the intended position, then realignment of the nozzle may be effected. In some examples, the corrective action may comprise deactivating the particular nozzle. A nozzle may be deactivated if, for example, the nozzle has failed to deposit print agent in accordance with the intended assessment pattern on multiple occasions (e.g. on three consecutive occasions). In some examples, the corrective action may comprise arranging for a different nozzle to deliver print agent instead of the particular nozzle. For example, if the particular nozzle fails to deposit print agent, or if the particular nozzle has been deactivated, then a nozzle, or multiple nozzles, adjacent to or near to the particular nozzle may be used to deposit extra print agent to compensate for the particular nozzle. In some examples, the corrective action may comprise arranging for the print apparatus to halt printing or pause a printing operation.

Figure 5:
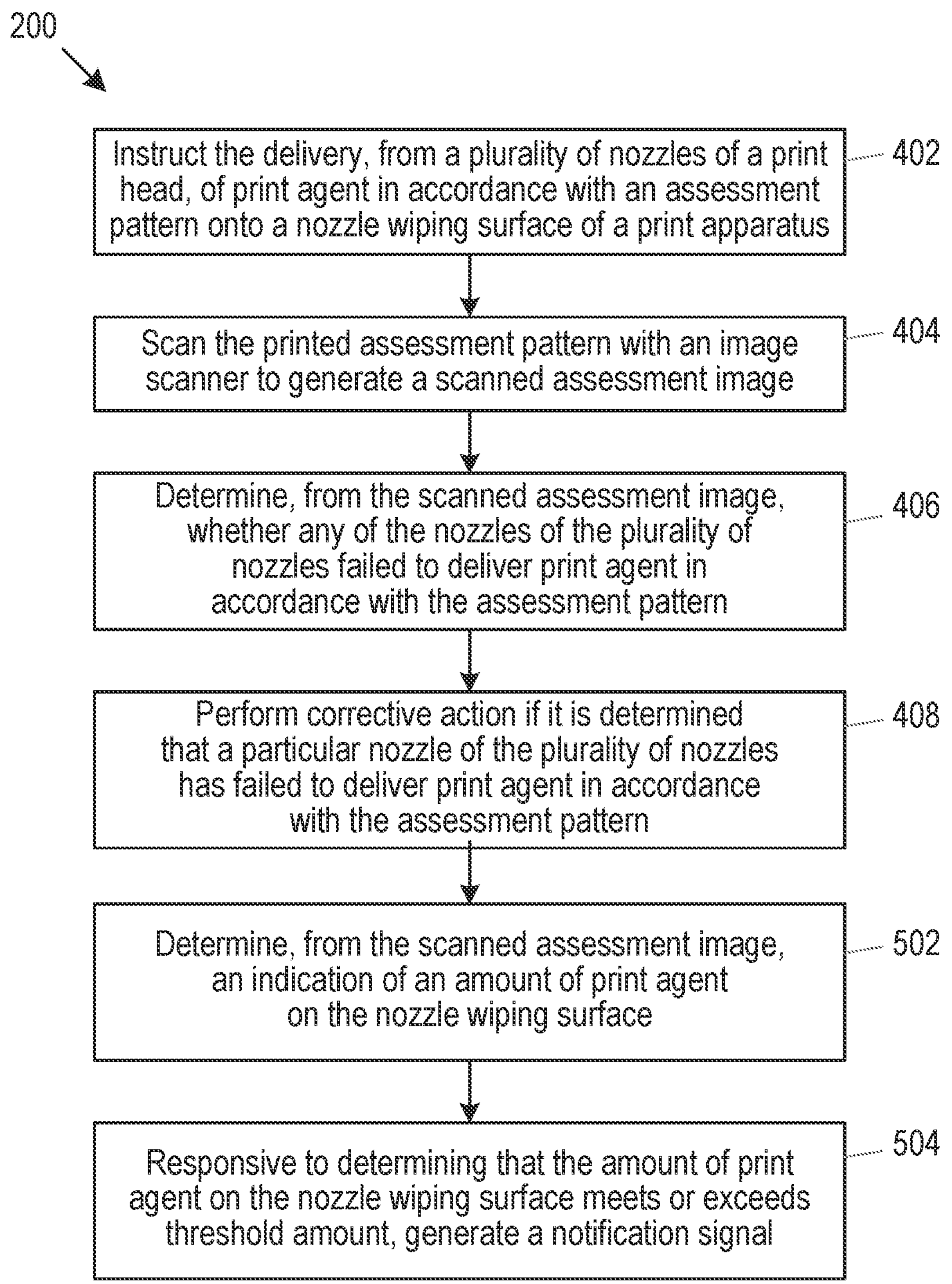
FIG. 5 is a flowchart of a further example of a method according to the present disclosure.

FIG. 5 is a flowchart of a further example of a method 500. The method 500 may comprise a computer-implemented method, and may include blocks of the method 400 discussed above. In some examples, the method 500 comprises, at block 502, determining, from the scanned assessment image, an indication of an amount of print agent on the nozzle wiping surface 108. For example, a determination may be made of a percentage of the nozzle wiping surface 108 shown in the scanned assessment image that contains print agent. At block 504, the method 500 comprises, responsive to determining that the amount of print agent on the nozzle wiping surface 108 meets or exceeds threshold amount, generating a notification signal. For example, if it is determined that more than around 75% of the nozzle wiping surface 108 appearing in the scanned assessment image is covered with print agent, then the notification signal may be generated. The notification signal may, in some examples, cause the nozzle wiping surface to be advanced (e.g. causing the web of material to be wound on) while, in other examples, the notification signal may comprise a notification to be delivered to an operator of the print apparatus. In some examples, if it is determined that the web of material used for the nozzle wiping surface 108 is approaching its end, then the notification signal may comprise a notification to the operator of the print apparatus that the nozzle wiping surface is to be replaced.

In some examples, nozzles 110 of a print head or of a print fluid application unit 104 may be grouped into sets or subsets. Thus, the print head may comprise a first subset of nozzles and a second subset of nozzles. In some examples, the plurality of nozzles 110 of block 402 may form the first subset of nozzles. In such examples, instructing the delivery of print agent (block 402) may comprise instructing the delivery of print agent from the first subset of nozzles and not from the second subset of nozzles. In other words, just a subset of the nozzles may be used to deliver print agent in accordance with the assessment pattern and the nozzle wiping surface 108. In this way, subsets of the nozzles 110 may be assessed separately. For example, nozzles that are not currently being used in a printing operation may be assessed according to the method 400, 500 without impacting on the printing operation.

The print apparatus 100, 200 may perform a maintenance operation, such as a nozzle wiping operation, at intervals during a printing operation, or between printing operations. The methods 400, 500 discussed herein may be performed at any time. However, performing the blocks of the methods 400, 500 at the time that coincides with a planned maintenance operation (e.g. when the print head or print fluid application unit 104 is positioned over the nozzle wiping surface 108) can help to reduce downtime of the print apparatus 100 200 and can help to reduce the impact on the printing operation. Thus, in some examples, instructing the delivery of print agent (block 402) may comprise instructing the delivery of print agent onto the nozzle wiping surface 108 at a time coinciding with a planned nozzle wiping operation associated with the print head.

Figure 6:
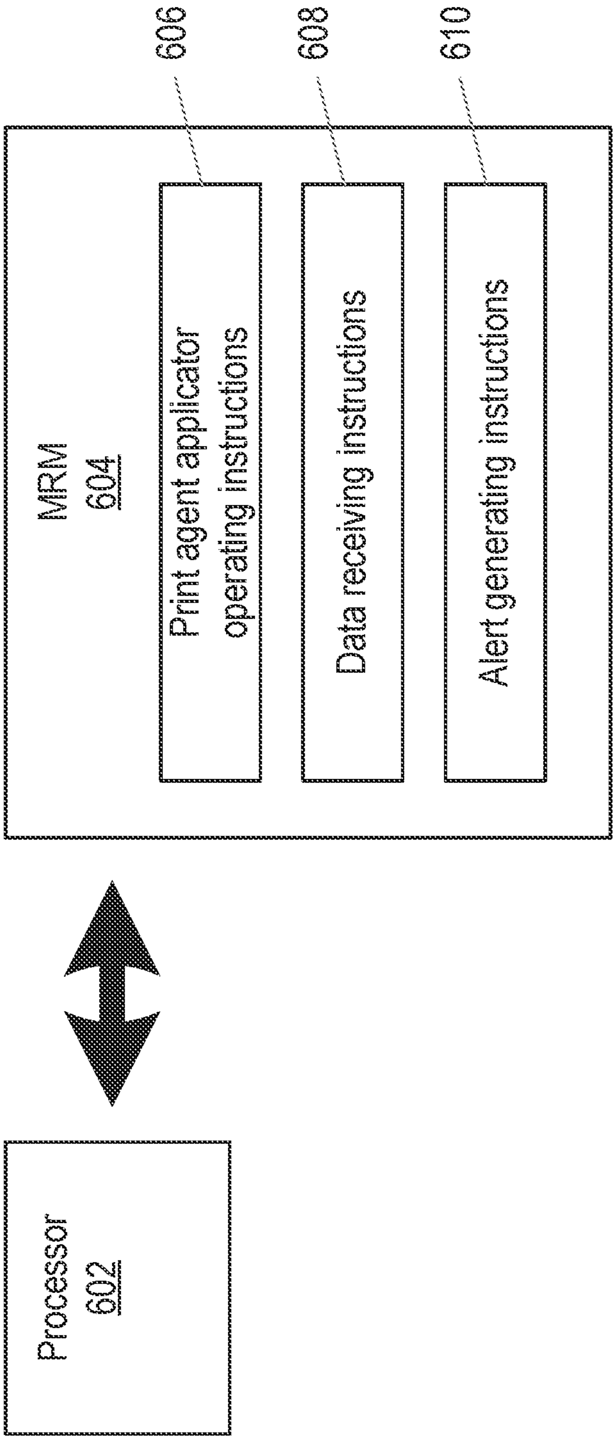
FIG. 6 is a schematic illustration of an example of a machine-readable medium in communication with a processor.

The present disclosure also provides a machine-readable medium. FIG. 6 is a schematic illustration of an example of a processor 602 in communication with a machine-readable medium 604. The processor 602 may, for example, comprise or be similar to the controller 102 discussed herein. The machine-readable medium 604 comprises instructions which, when executed by the processor 602, cause the processor to perform various functions, such as functions corresponding to blocks of the methods 400, 500 discussed above and/or functions performed by the controller 102 discussed above. For example, the machine-readable medium 604 comprises instructions (e.g. print agent applicator operating instructions 606) which, when executed by the processor 602, cause the processor to operate a print agent applicator (e.g. the print fluid application unit 104 or the print head discussed herein) to eject print agent onto a wiping medium (e.g. the nozzle cleaning surface of the nozzle wiping surface 108) according to a defined pattern in which print agent is intended to be ejected from each nozzle of a plurality of nozzles of the print agent applicator to form a discrete patch of print agent on the wiping medium. The machine-readable medium 604 comprises instructions (e.g. data receiving instructions 608) which, when executed by the processor 602, cause the processor to receive, from a sensor (e.g. the scanning unit 106 or the image scanner discussed herein), data indicative of whether or not each nozzle of the plurality of nozzles 110 ejected print agent onto the wiping medium 108 in accordance with the defined pattern. The machine-readable medium 604 comprises instructions (e.g. alert generating instructions 610) which, when executed by the processor 602, cause the processor to, responsive to determining that a nozzle of the plurality of nozzles 110 did not eject print agent onto the wiping medium 108 in accordance with the defined pattern, generating an alert signal. The alert signal may comprise any of the alert signals, instruction signals or signals to perform corrective action discussed herein. In one example, the generated alert signal may comprise a signal to control the print agent applicator 104 to perform a wiping operation whereby the nozzle of the plurality of nozzles 110 is wiped by the wiping medium 108.

Examples disclosed herein provide a mechanism by which nozzles of a print fluid application unit 104 may print a test image or test pattern during a printing operation, without impacting on the printing operation. This is achieved by causing the test image to be printed onto the nozzle cleaning surface 108, rather than onto the printable medium 112, on which an image is to be printed as part of the printing operation. Furthermore, by scanning or assessing the printed test image in real time, immediately after the test image has been printed, a rapid assessment of the nozzles may be performed, thus identifying any potential defects with the nozzles before any significant print quality defects have been caused in the printing operation. Moreover, by identifying any potential nozzle defects early, remedial action may be taken, such as performing a maintenance operation (e.g. a nozzle wiping operation) to clean the affected nozzles. This also has the effect of prolonging the life of the nozzles and the print fluid application unit 104, by performing appropriate maintenance operations at an appropriate time, rather than merely periodically, when scheduled.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print apparatus comprising:

a print fluid application unit having a plurality of nozzles through which print fluid is to be deposited onto a printable medium during a printing operation;

a nozzle cleaning surface to engage nozzles during a nozzle cleaning operation;

a scanning unit; and a controller to:

control the print fluid application unit to deposit print fluid from nozzles of the plurality of nozzles according to an intended pattern onto the nozzle cleaning surface;

control the scanning unit to scan the pattern formed on the nozzle cleaning surface; and responsive to determining, based on the scan, that print fluid from a nozzle of the plurality of nozzles has not been deposited according to the intended pattern, generate an instruction signal regarding maintenance of the print fluid application unit.

2. A print apparatus according to claim 1, wherein the scanning unit and the print fluid application unit are movable relative to the printable medium in a synchronous manner.

3. A print apparatus according to claim 1, further comprising:

a carriage coupled to the print fluid application unit and the scanning unit, the carriage to move over the printable medium and the nozzle cleaning surface.

4. A print apparatus according to claim 1, wherein the scanning unit comprises an optical sensor to detect deposits of print fluid formed on the nozzle cleaning surface by nozzles of the plurality of nozzles.

5. A print apparatus according to claim 1, wherein the nozzle cleaning surface comprises a web of material; and wherein the controller is to:

generate an instruction signal to advance the web of material, responsive to determining, based on the scan, that a defined threshold amount of print fluid has been deposited onto a portion of the nozzle cleaning surface onto which the print fluid is to be deposited.

6. A print apparatus according to claim 1, wherein the nozzle cleaning surface comprises a web of material; and wherein the controller is to:

generate an alert signal, responsive to determining, based on the scan, that an amount of print fluid that has been deposited onto the nozzle cleaning surface meets or exceeds a defined threshold amount.

7. A print apparatus according to claim 1, wherein the instruction signal regarding maintenance of the print fluid application unit comprises a signal to cause the nozzle of the print fluid application unit to be wiped by the nozzle cleaning surface.

8. A method comprising:

instructing the delivery, from a plurality of nozzles of a print head, of print agent in accordance with an assessment pattern onto a nozzle wiping surface of a print apparatus;

scanning the printed assessment pattern with an image scanner to generate a scanned assessment image;

determining, from the scanned assessment image, whether any of the nozzles of the plurality of nozzles failed to deliver print agent in accordance with the assessment pattern; and performing corrective action if it is determined that a particular nozzle of the plurality of nozzles has failed to deliver print agent in accordance with the assessment pattern.

9. A method according to claim 8, wherein the assessment pattern comprises a discrete deposit of print agent from each nozzle of the plurality of nozzles.

10. A method according to claim 8, wherein the corrective action comprises an action selected from a group comprising: providing a notification for delivery to an operator of the print apparatus; performing or scheduling a nozzle wiping operation in respect of the particular nozzle; performing a realignment action in respect of the particular nozzle; deactivating the particular nozzle; arranging for a different nozzle to deliver print agent instead of the particular nozzle; and arranging for the print apparatus to halt printing.

11. A method according to claim 8, further comprising:

determining, from the scanned assessment image, an indication of an amount of print agent on the nozzle wiping surface;

responsive to determining that the amount of print agent on the nozzle wiping surface meets or exceeds threshold amount, generating a notification signal.

12. A method according to claim 8, wherein the print head comprises a first subset of nozzles and a second subset of nozzles;

wherein the plurality of nozzles forms the first subset of nozzles; and wherein said instructing comprises instructing the delivery of print agent from the first subset of nozzles and not from the second subset of nozzles.

13. A method according to claim 8, wherein said instructing comprises instructing the delivery of print agent onto the nozzle wiping surface at a time coinciding with a planned nozzle wiping operation associated with the print head.

14. A machine-readable medium comprising instructions which, when executed by a processor, cause the processor to:

operate a print agent applicator to eject print agent onto a wiping medium according to a defined pattern in which print agent is intended to be ejected from each nozzle of a plurality of nozzles of the print agent applicator to form a discrete patch of print agent on the wiping medium;

receive, from a sensor, data indicative of whether or not each nozzle of the plurality of nozzles ejected print agent onto the wiping medium in accordance with the defined pattern; and responsive to determining that a nozzle of the plurality of nozzles did not eject print agent onto the wiping medium in accordance with the defined pattern, generating an alert signal.

15. A machine-readable medium according to claim 14, wherein the generated alert signal comprises a signal to control the print agent applicator to perform a wiping operation whereby the nozzle of the plurality of nozzles is wiped by the wiping medium.

* * * * *